US012753870B2

(12) United States Patent
Ancone et al.

(10) Patent No.: US 12,753,870 B2
(45) Date of Patent: Oct. 6, 2026

(54) PIPE FITTING

(71) Applicant: Tyco Fire Products LP, Cranston, RI (US)

(72) Inventors: Mathew R. Ancone, Warwick, RI (US); Raul G. Pereira, North Smithfield, RI (US)

(73) Assignee: Tyco Fire Products LP, Cranston, RI (US)

( * ) Notice: Subject to any disclaimer, the term of this patent is extended or adjusted under 35 U.S.C. 154(b) by 0 days.

(21) Appl. No.: 19/053,964

(22) Filed: Feb. 14, 2025

(65) Prior Publication Data

US 2025/0264178 A1 Aug. 21, 2025

Related U.S. Application Data

(60) Provisional application No. 63/554,452, filed on Feb. 16, 2024.

(51) Int. Cl.
*F16L 41/02* (2006.01)
*F16L 17/02* (2006.01)

(52) U.S. Cl.
CPC ............. *F16L 41/021* (2013.01); *F16L 17/02* (2013.01)

(58) Field of Classification Search
CPC ....... F16L 41/08; F16L 41/086; F16L 41/088; F16L 41/12
USPC ......................................... 285/199, 198, 197
See application file for complete search history.

(56) References Cited

U.S. PATENT DOCUMENTS

| | | | | | |
|---|---|---|---|---|---|
| 2,693,975 | A * | 11/1954 | Smith | F16L 41/12 | 285/108 |
| 4,506,917 | A * | 3/1985 | Hansen Arne | F16L 41/12 | 285/198 |
| 4,961,597 | A * | 10/1990 | Bowen | F16L 27/047 | 285/197 |
| 5,697,650 | A * | 12/1997 | Brown | F16L 41/12 | 411/537 |
| 5,906,048 | A * | 5/1999 | Bender | F16L 41/12 | 137/5 |
| 6,412,824 | B2 * | 7/2002 | Kunsman | F16L 41/12 | 285/198 |
| 2003/0030275 | A1 * | 2/2003 | Nicolini | F16L 37/008 | 285/197 |
| 2017/0122474 | A1 * | 5/2017 | Borawski | F16L 41/12 | |
| 2024/0027011 | A1 * | 1/2024 | Sumida | F16L 41/088 | |

FOREIGN PATENT DOCUMENTS

| | | | |
|---|---|---|---|
| JP | 04347092 | A * | 12/1992 |
| JP | 05010487 | A * | 1/1993 |

* cited by examiner

*Primary Examiner* — David Bochna
(74) *Attorney, Agent, or Firm* — Foley & Lardner LLP

(57) ABSTRACT

A pipe fitting can include an inlet, an outlet, a passageway along an axis between the inlet and the outlet, and a gasket. The inlet includes an inner wall at the passageway, an outer wall outward from the inner wall relative to the axis, and a groove between the inner wall and the outer wall. The gasket includes a head and a collar extending from the head, the gasket sized to be received in the groove such that the head is inside the groove and the collar is outside the groove.

18 Claims, 7 Drawing Sheets

PIPE FITTING

CROSS-REFERENCE TO RELATED APPLICATIONS

The present application claims the benefit of and priority to U.S. Provisional Application No. 63/554,452, filed Feb. 16, 2024, the disclosure of which is incorporated herein by reference in its entirety.

BACKGROUND

The present disclosure relates generally to pipe fittings. Pipe fittings can be used to connect components to pipes. For example, pipe fittings can be used to connect sprinklers or other fluid distribution devices to piping to allow for fluid flow from the piping to the sprinklers.

SUMMARY

At least one aspect relates to a fitting, such as a pipe fitting and/or pipe fitting assembly. The fitting includes an inlet, an outlet, a passageway along an axis between the inlet and the outlet, and a gasket. The inlet includes an inner wall at the passageway, an outer wall outward from the inner wall relative to the axis, and a groove between the inner wall and the outer wall. The gasket includes a head and a collar extending from the head, the gasket sized to be received in the groove such that the head is inside the groove and the collar is outside the groove.

At least one aspect relates to a piping system. The piping system includes a pipe and a fitting. The pipe includes an interior surface and an exterior surface. The pipe defines a hole from the interior surface to the exterior surface. The fitting is to mount to the pipe to couple the pipe with a branch pipe. The fitting includes a groove. The fitting includes a gasket including a head and a collar extending from the head. The gasket is sized to be received in the groove such that the head is inside the groove and the collar is outside the groove and in contact with the hole.

At least one aspect relates to a fitting for connection to a wall of a header pipe having an interior surface and an exterior surface. The header pipe includes a hole extending from the exterior surface to the interior surface. The fitting includes a rigid body and a gasket. The rigid body has a inlet and a outlet, and is mountable on the exterior surface of the header pipe such that the inlet is aligned with the hole. The rigid body does not extend beyond the interior surface of the header pipe. The gasket is at least partially received in the rigid body. The gasket has a collar extending into the hole when the rigid body is mounted on the wall of the header pipe to facilitate alignment of the inlet with the hole.

In some aspects, the rigid body does not extend beyond the exterior surface of the header pipe into the hole.

In some aspects, the fitting is a mechanical tee, an elbow, a cross, or a coupling.

In some implementations, the rigid body includes a groove to receive the gasket at least partially. The groove can surround the inlet of the rigid body.

In some aspects, a portion of the gasket received in the rigid body extends beyond the collar in a radial direction.

At least one aspect relates to a pipe arrangement including a header pipe and a fitting. The header pipe has an interior surface, an exterior surface, and a hole extending from the exterior surface to the interior surface. The fitting is mounted on a wall of the header pipe to couple a branch pipe to the header pipe. The fitting includes a rigid body and a gasket.

The rigid body has a inlet and a outlet, and is mountable on the exterior surface of the header pipe such that the inlet is aligned with the hole. The rigid body does not extend beyond the interior surface of the header pipe. The gasket is at least partially received in the rigid body. The gasket has a collar extending into the hole when the rigid body is mounted on the wall of the header pipe to facilitate alignment of the inlet with the hole.

In some aspects, the rigid body includes a groove to receive the gasket at least partially. The groove can surround the inlet of the rigid body.

At least one aspect relates to a method of a fitting to a pipe having an interior surface, an exterior surface, and a hole extending from the exterior surface to the interior surface. The method includes inserting a collar of a gasket in the hole, attaching the gasket to a rigid body of the fitting, and securing the rigid body to the pipe. The rigid body not extending beyond the interior surface of the pipe.

In some aspects, the gasket is at least partially received in a groove formed on the rigid body. The groove can surround the inlet of the rigid body.

In some aspects, the rigid body does not extend beyond the exterior surface of the pipe into the hole.

DETAILED DESCRIPTION

Figure 1:
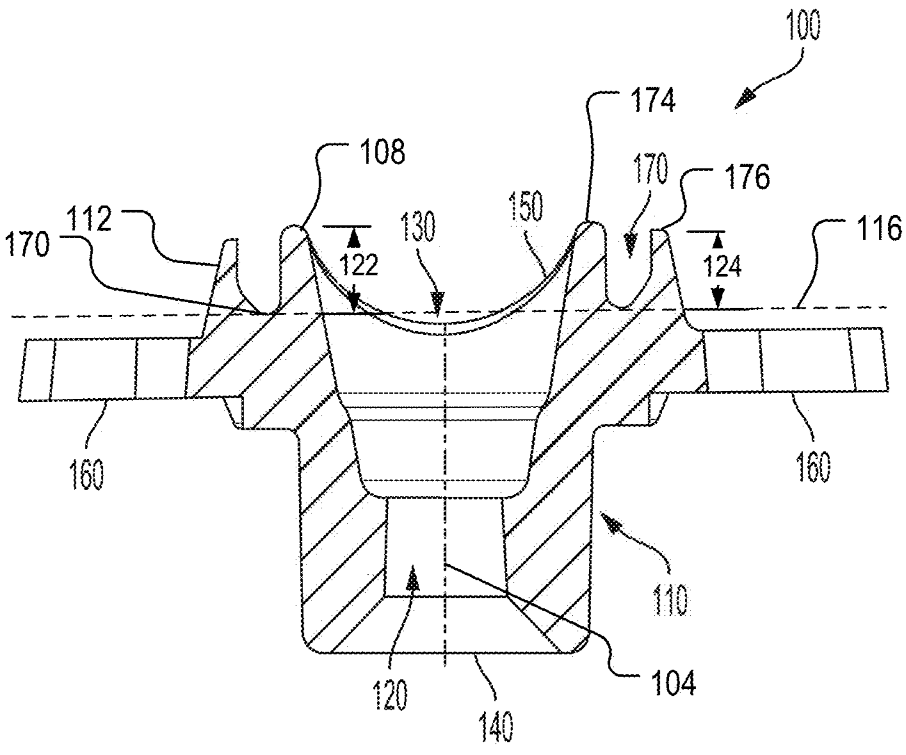
FIG. 1 depicts an example of a schematic sectional view of a rigid body of a pipe fitting.

Following below are more detailed descriptions of various concepts related to, and implementations of apparatuses, systems, and methods of pipe fittings and gaskets of pipe fittings, including gaskets that can facilitate installation and/or alignment of a pipe fitting. The various concepts introduced above and discussed in greater detail below can be implemented in any of numerous ways, including in dry systems and in wet systems, such as to facilitate connecting a fluid distribution device, such as a sprinkler or nozzle, with piping from which fluid can be received to output from the fluid distribution device.

Fire protection systems and/or sprinkler systems can include sprinklers that are provided in structures such as buildings and/or warehouses. The buildings can have stored commodities to be protected from fires. The sprinklers can be arranged to address a fire in proximity to and/or of the stored commodities, such as to output fluid (e.g., water) to address the fire. In such uses cases, among others, fittings (e.g., pipe fittings) can be used to connect the sprinklers with pipes, such as to receive fluid from a fluid supply at the sprinklers.

For example, a fitting, such as a mechanical tee, elbow, cross, or coupling, can facilitate fluid communication between multiple components such as pipes, adapters, and/or sprinklers. The fitting can connect a first pipe to a branch connection of a second pipe. The branch connection can be formed by creating a hole on the second pipe. The fitting can be mounted on the second pipe such that an inlet of the fitting is in fluid communication with the hole on the second pipe, and an outlet of the fitting is coupled to the first pipe. While mounting the fitting on the second pipe, it is useful for the inlet of the fitting to be aligned with the hole on the second pipe. In case of misalignment between the fitting and the pipe onto which the fitting is mounted, fluid can leak through an assembly of the fitting and the pipe; flow losses can occur while fluid is conveyed through the pipe and the fitting.

Systems and methods in accordance with the present disclosure can provide a gasket can facilitate aligning the fitting onto a pipe. The fitting can include a rigid body that can be mounted on a pipe. The rigid body has a passageway with a inlet and a outlet. The rigid body is mounted on the pipe such that the rigid body does not extend into interior of the pipe. The rigid body can be sized to not extend past an outer surface of the pipe through the hole.

The fitting includes a gasket provided to prevent fluid leakage in an operative configuration of the fitting. The gasket helps an installer to properly mount the fitting onto the pipe. The gasket can have a collar that is receivable in the hole on the pipe. The gasket is positioned such that reception of the gasket into the hole can align the inlet of the fitting and the hole on the pipe. The gasket can be structured to engage the pipe in a manner that mechanically communicates the contact between the gasket and the hole on the pipe, while reducing or avoiding interference with fluid flow from the pipe into the fitting after mounting of the fitting onto the pipe.

For example, the gasket can include a head and a collar extending from the head, the gasket sized to be received in the groove such that the head is inside the groove and the collar is outside the groove. This can allow the gasket to facilitate alignment with reduced effects on the performance of the fitting, such as to mitigate any reduction in flow rate through the fitting and/or K-factor of the fitting that may otherwise result from insertion of insertion of alignment features of the fitting itself into a flow path through the pipe and/or fitting (e.g., from alignment features of a rigid body of the fitting). The collar can be sized, e.g., in at least one of length and diameter, to provide a sufficient mechanical response to engagement with the hole (e.g., to be perceived by an installer holding the fitting with the gasket in the groove), while having reduced or no interference with fluid flow, and while avoiding the need for the rigid body of the fitting itself to be used for alignment.

FIG. 1 depicts a body 110 of a fitting 100. The body 110 can be rigid, e.g., to be more rigid and/or less resilient than gasket 180. The body 110 can be mounted on a pipe. The body 110 can include a passageway 120 (e.g., passageway) between an inlet 130 and an outlet 140.

The fitting 100 can include an inlet 130, which can be formed at an end of the body 110. For example, an inlet surface 150 defining the inlet 130 can have a shape complementary to an exterior surface of the pipe onto which the fitting 100 is to be mounted.

The outlet 140 can be coupled to another pipe, for example, a branch pipe. The fitting 100 can be a reducing type fitting, such as where a cross-sectional area of the outlet 140 is smaller than cross-sectional area of the inlet 130. A portion of the passageway 120 proximal to the outlet 140 can be threaded to secure the branch pipe having complementary threads with the fitting 100. A portion of the passageway 120 can be internally threaded to receive externally threaded branch pipe.

The inlet 130 and outlet 140 can be co-axial, thereby forming linear passageway 120. For example, fluid can flow straight through such linear passageway 120. The passageway 120 can be a non-linear passage. The inlet 130 and the outlet 140 can be non-coaxial, such as where the axis of the inlet 130 can make a predetermined angle with the axis of the outlet 140. The inlet 130 and the outlet 140 can be co-planar. The inlet 130 and the outlet 140 can be non-coplanar.

The body 110 can include one or more mounting members 160 for mounting the body 110. The mounting members 160 can extend in opposite directions. The mounting members 160 can be inline with each other. In some embodiments, the mounting members 160 can be arcuate shaped complementary to a mounting surface on which the fitting 100 is mounted. The mounting members 160 can include suitable geometric features, for example, holes, hooks, etc., to secure the fitting 100.

The body 110 can be metallic. For example, the body 110 can be made of ductile iron. The body 110 can be made of a material including, but not limited to, metals, non-metals, composite material, polymeric material, etc.

Figure 2:
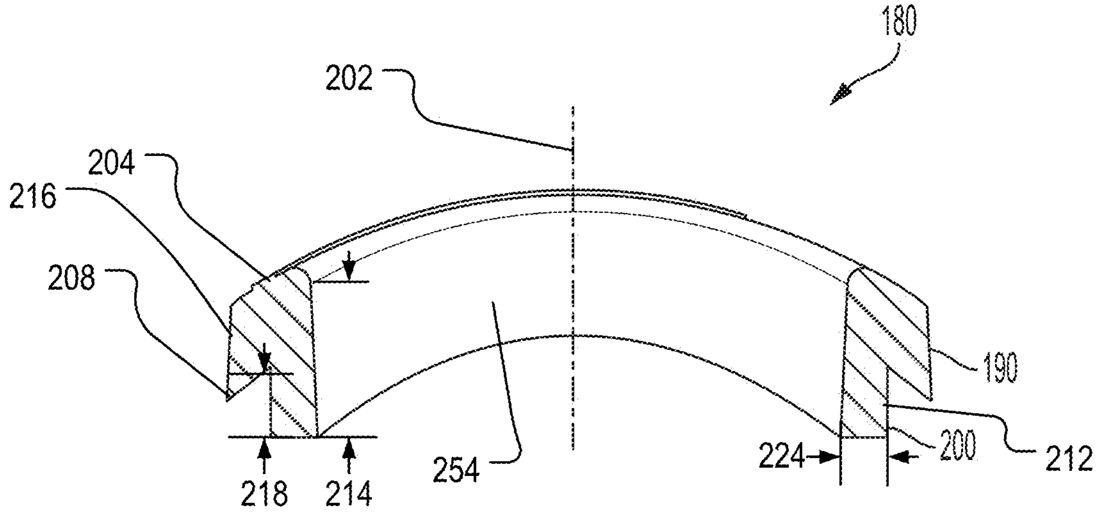
FIG. 2 depicts a schematic view of an example of a gasket of a fitting.

The body 110 can include a groove 170, which can receive a gasket (e.g., gasket 180 depicted in FIG. 2). The groove 170 can surround the inlet 130. Dimensions of the groove 170, for example, width, depth, etc., can correspond to the size of the gasket.

As depicted in FIG. 1, the passageway 120 can at least partially extend along an axis 104 (e.g., longitudinal axis). The body 110, e.g., the inlet 130 of the body 110, can include an inner wall 108 at the passageway 120, and can include an outer wall 112 outward from the inner wall 108 relative to the axis 104. The groove 170 can be between the inner wall 108 and the outer wall 112, and can be outward (e.g., radially outward) from the axis 104. The groove 170 can be around, surround, and/or circumscribe the axis 104. The groove 170 can be outward and/or radially outward from the inlet 130 relative to the axis 104.

The groove 170 can define a plane 116. The plane 116 can be perpendicular to the axis 104 and/or tangent to an end 172 of the groove 170, the end 172 closer to the outlet 140 than the inlet 130. One or more dimensions of the groove 170 (and gasket 180) can be defined relative to the plane 116. For example, the inner wall 108 can have a length 122 from the plane 116 to an end 174 of the inner wall 108. The outer wall 112 can have a length 124 from the plane 116 to an end 176 of the outer wall 112. The length 122 can be greater than the length 124, which can allow for effective guidance of the fitting 100 to a pipe without interfering with flow through the pipe. The groove 170 can be on a same side of the body 110 as the inlet 130, such as on a same side of the body 110 relative to the plane 116.

FIG. 2 depicts an example of a gasket 180. The gasket 180 can be used with the fitting 100. The gasket 180 can be made of a resilient material, including but not limited to a rubber material. The gasket 180 can be more resilient and/or flexible than the body 110.

The gasket 180 can include a head 190 (e.g., head portion). The head 190 can be a portion of the gasket 180 to be at least partially received in the groove 170. The head 190 can be annular and/or circular. The head 190 can include a first end 204 and a second end 208. The second end 208 can be shaped to facilitate fluid sealing of the gasket 180 with the groove 170 and/or a pipe coupled with the fitting 100.

The gasket 180 can include a collar 200. The collar 200 can extend from the head 190. For example, the collar 200 and head 190 can be contiguous, such as to have respective inner and/or outer surfaces that are contiguous. For example, an outer surface 212 (e.g., an outer edge of the collar 200) of the collar 200 can be contiguous with an outer surface 216 (e.g., an outer edge of the head 190) of the head 190. For example, an outer surface forming the second end 208 and/or between the first end 204 and the second end 208. The head 190 and collar 200 can be integrally formed.

As depicted in FIG. 2, the head 190, e.g., the outer surface 216 of the head 190, can be outward from the collar 200, such as to be outward from the outer surface 212 relative to the axis 104 and/or an axis 202 of the gasket 180. A length of the outer surface 216 can be less than a length 214 of an inner surface 254 of the gasket 180, such that the collar 200 can extend further along the axis 202 than the head 190.

For example, the collar 200 can have a length 218 by which the collar 200 extends out of the groove 170; the length 218 can be greater than at least one of the length 122, the length 124, and a difference between the length 122 and the length 124, such as allow the collar 200 to extend beyond the groove 170 into the pipe. The transition from the outer surface 216 of the head 190 to the outer surface 212 of the collar 200 can have a shape to conform to engagement with a pipe, such as to have an angled transition or a radiused transition, for example and without limitation.

Figure 3:
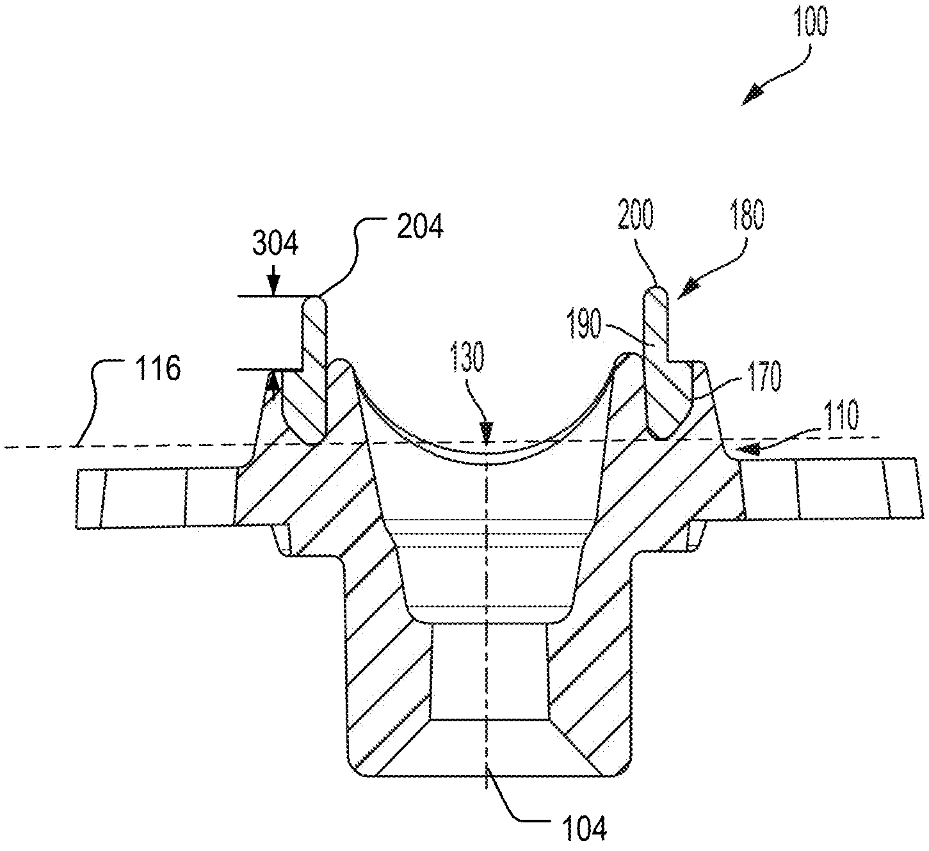
FIG. 3 depicts a sectional view of example of a fitting.

FIG. 3 depicts an example of the fitting 100 in which the body 110 is coupled with the gasket 180. The gasket 180 can be attached to the body 110. The gasket 180 and the body 110 can be pre-assembled to form the fitting 100 as a component to be mounted on the pipe. The gasket 180 can be placed on the pipe, and the fitting 100 can then be mounted on the pipe.

The gasket 180 can be received in the groove 170. For example, the head 190 of the gasket 180 can be received in the groove 170. The groove 170 can surround the inlet 130. This can position the gasket 180 to surround the inlet 130 when the gasket 180 is attached to and/or received in the body 110.

The gasket 180 can be attached to the body 110 such that the head 190 is received in the groove 170 and the collar 200 extends away from the body 110. A portion of the collar 200 or entire collar 200 can remain outside the groove 170.

The fitting 100 can be a mechanical tee, an elbow, a cross, or a coupling. The fitting 100 can be a mechanical tee used to connect one pipe to another. The fitting 100 can be used to connect a branch pipe to a header pipe. The branch pipe can have a smaller diameter than the header pipe. The fitting 100 can be a reducing type fitting, and the outlet 140 can have a smaller diameter than the inlet 130 to facilitate connection of the fitting 100 with the branch pipe. The fitting 100 can be utilized to connect any other types of pipes.

In fire suppression systems, the fitting 100 can be used to connect a branch pipe to a header pipe for conveying fire suppressant fluid from the header pipe into the branch pipe. The fitting 100 can be attached to an external surface of the header pipe such that the inlet 130 is aligned with a hole on the header pipe. One end of the branch pipe can be connected to the outlet 140 of the fitting 100. Free end of the branch pipe can be connected to suitable component of the fire suppression system such as, but not limited to, another pipe, sprinkler heads, valve, etc.

A sprinkler, e.g., fire sprinkler head, can be attached to the outlet 140 of the fitting 100. The outlet 140 can be sized according to external threads on the sprinkler head to facilitate threaded coupling between the fitting 100 and the sprinkler head. The sprinkler head and the fitting 100 can be integrally formed. For example, the sprinkler head can be integrated with the body 110 of the fitting 100, such that the body 110 along with integrated sprinkler head can be attached to external surface of the header or branch pipe.

Figure 4:
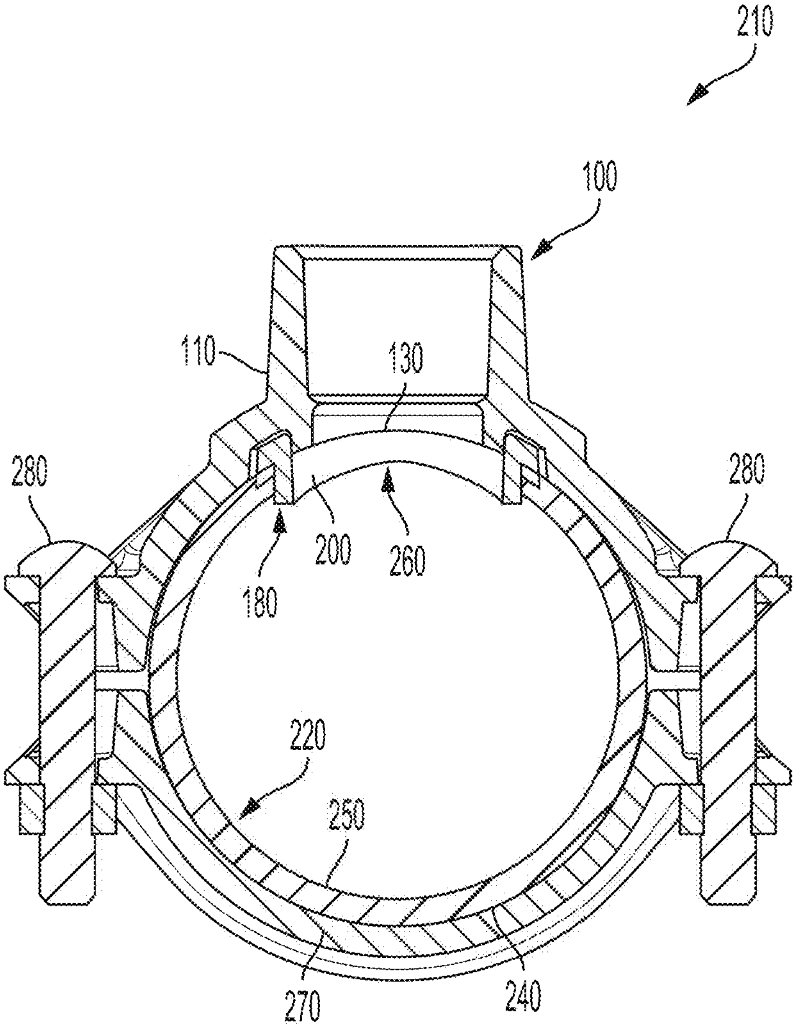
FIG. 4 depicts a sectional view of an example a pipe arrangement along a radial direction.
Figure 5:
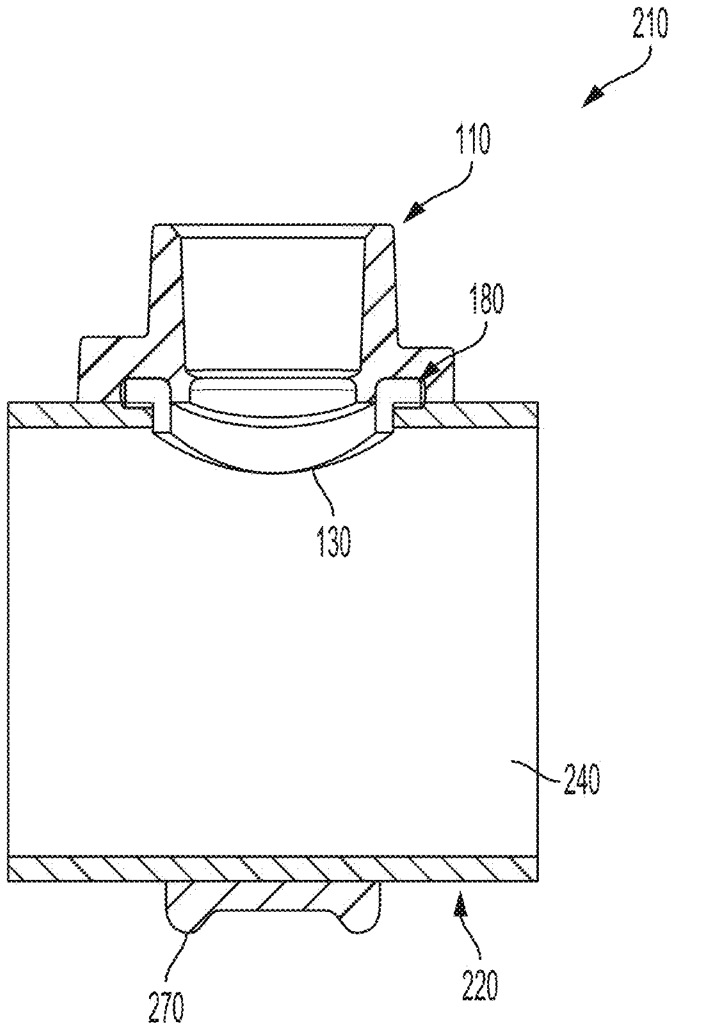
FIG. 5 depicts a sectional view of an example of a pipe arrangement along an axial direction.

FIG. 4 depicts a sectional view of a pipe arrangement 210 along a radial direction, and FIG. 5 depicts a sectional view of the pipe arrangement 210 along an axial direction. As depicted in FIGS. 4 and 5, the pipe arrangement 210 can include a pipe 220 and the fitting 100. The pipe 220 can be a header pipe, for example and without limitation. The pipe 220 can have an exterior surface 240 and an interior surface 250. The pipe 220 can define a hole 260, through which fluid can be outputted from the pipe 220. The hole 260 can be defined in body of the pipe 220, such as to extend from the exterior surface 240 to the interior surface 250. The sizing of the collar 200 (e.g., thickness 224 depicted in FIG. 2) can correspond to a size of the pipe 220, such as to at least one of a nominal size, outer diameter, wall thickness, and schedule of the pipe 220 (e.g., schedule 40, schedule 80).

The fitting 100 can be mounted on the exterior surface 240 of the pipe 220. For example, the body 110 can be mounted on the exterior surface 240 of the pipe 220. The body 110 can be secured to the pipe 220. For example, the fitting 100 can include a clamp 270 to secure the body 110 to the pipe 220. The clamp 270 can have an arcuate shape complementary to the exterior surface 240 of the pipe 220. The clamp 270 can be connected to the body 110 using fasteners 280 such that the pipe 220 passes through a space enclosed by the body 110 and the clamp 270. The clamp 270 and the body 110 can tightly abut the exterior surface 240 of the pipe 220 to prevent fluid losses.

The clamp 270 can be a rigid metallic member. The clamp 270 can be a strap attached to the mounting members 160 of the fitting 100. The mounting members 160 can have fasteners, for example, hooks, to securely attach the strap to the fitting 100. The mounting members 160 can be defined on an opposite side of the plane 116 from the groove 170, or can be at least partially on a same side of the plane 116 as the groove 170.

Responsive to being mounted on the pipe 220, the body 110 may not extend beyond the interior surface 250 into the hole 260. For example, the inlet surface 150 (as depicted in FIG. 1) may not extend beyond the interior surface 250 into the hole 260. The inlet 130 or the inlet surface 150 can extend beyond the exterior surface 240 of the pipe 220, but not beyond the interior surface 250 in the hole 260. A free end of the inlet 130 can remain in the hole 260 between the exterior surface 240 and the interior surface 250. The body 110 can be sized to not extend beyond the exterior surface 240 into the hole 260. The inlet surface 150 or the inlet 130 can remain outside the boundaries of the hole 260.

The gasket 180 can be at least partially received in the hole 260. For example, the collar 200 extend into the hole 260. The collar 200 can be in a tight fit with the hole 260. The collar 200 can extend into the interior of the pipe 220 beyond the interior surface 250. The collar 200 can extend up to the interior surface 250.

The collar 200 can extend past the exterior surface 240, and terminate prior to the interior surface 250, thereby remaining in the hole 260 between the exterior surface 240 and the interior surface 250. For example, a length 304 (which can correspond to the length 218) by which the collar 200 extends out of the groove 170 is within twenty percent of a diameter of the pipe 220.

A width of the head 190 as measured across the head 190 as positioned in the groove 170 can be greater than a width of the collar 200 (e.g., the widths measured in a direction perpendicular to the axis 202). Such sizing can facilitate the resilience of the collar 200 as well as secure engagement of the gasket 180 with the body 110 and/or with the hole 260.

As the gasket 180 surrounds the inlet 130, the inlet 130 and the hole 260 can be aligned with each other when the gasket 180 is received in the hole 260. The gasket 180 can act as locator for aligning the inlet 130 and the hole 260.

Figure 6:
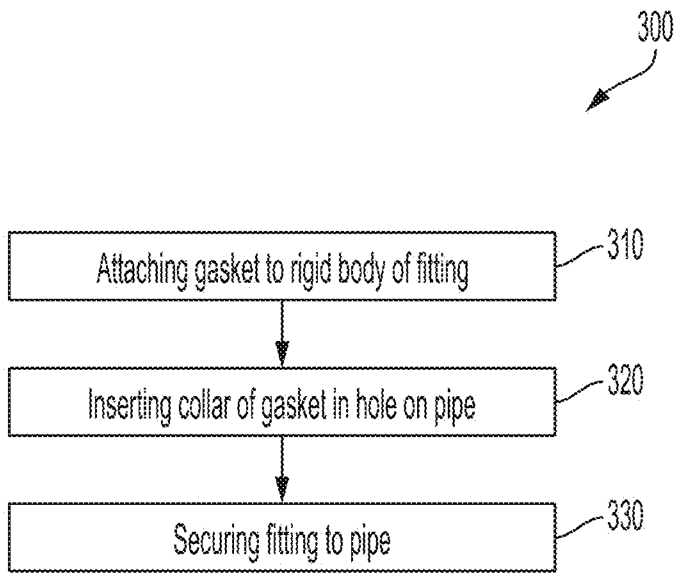
FIG. 6 is a flow diagram of an example of a method of attaching a fitting.

FIG. 6 depicts a method 300 of attaching the fitting to the pipe. At 310, a gasket can be coupled with a body of a fitting. For example, the gasket can be at least partially received in the groove of the body, where the groove is formed around the inlet of the body. The head of the gasket can be secured in the groove of the body such that the collar extends away from the body. At 320, the body and/or the gasket can be mounted on the exterior surface of the pipe by inserting the collar in the hole on the pipe.

As the gasket surrounds the inlet, reception of the collar of the gasket in the hole can result in alignment of the inlet with the hole. As such, the gasket, such as the collar of the gasket, can act as a locator while attaching the fitting to the pipe.

In a mounted configuration, the body may not extend beyond the interior surface into the hole. The inlet or the inlet surface can extend beyond the exterior surface of the pipe, but not beyond the interior surface in the hole. A free end of the inlet can remain in the hole between the exterior surface and the interior surface. The inlet or the inlet surface can not extend beyond the exterior surface of the pipe.

At 330, responsive to the body being attached to the pipe and the inlet is aligned with the hole, the fitting can be secured to the pipe. The fitting can be secured to the pipe. A clamp can be connected to the body to secure the fitting to the pipe.

Figure 7:
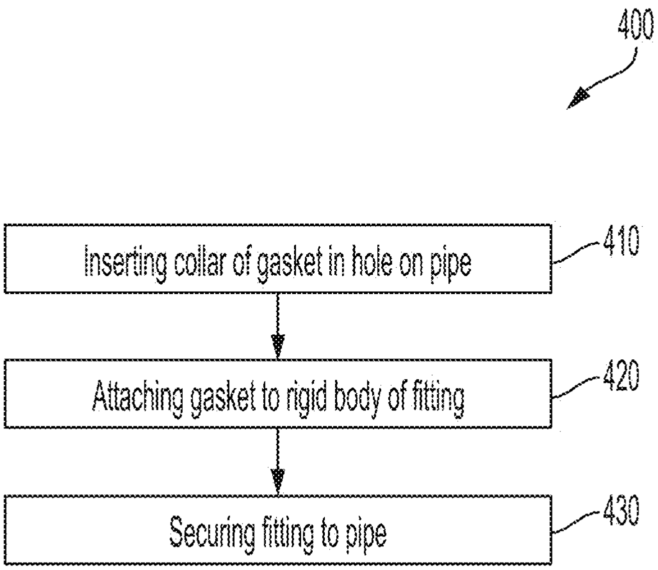
FIG. 7 is a flow diagram of an example of a method of attaching a fitting.

FIG. 7 depicts an example of a method 400 of attaching the fitting to the pipe. At 410, the gasket can be inserted in the hole on the. The collar can be inserted in the hole, and the head portion of the gasket is kept outside of the hole.

At 420, the gasket can be attached to the body. For attachment, the gasket can be at least partially received in the groove of the body, where the groove can be formed around the inlet of the body. The head portion of the gasket can be secured in the groove of the body. As the groove surrounds the inlet, attachment of the gasket with the body can result in alignment of the inlet with the hole.

At 430, responsive to the gasket being attached to the body, and the inlet is aligned with the hole, the fitting can be secured to the pipe. The fitting can be secured to the pipe. The clamp can be connected to the body to secure the fitting to the pipe.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A pipe fitting, comprising:

an inlet;

an outlet;

a passageway along an axis between the inlet and the outlet;

the inlet comprising an inner wall at the passageway, an outer wall outward from the inner wall relative to the axis, and a groove between the inner wall and the outer wall; and a gasket in the groove, the gasket comprising a head and a collar extending from the head, the gasket sized to be received in the groove such that the head is inside the groove and the collar is outside the groove, the collar structured to extend past an exterior surface of a hole of a pipe to which the pipe fitting is to be coupled, the inlet structured such that the inlet does not extend past the exterior surface.

2. The pipe fitting of claim 1, comprising:

the head is wider than the collar in a direction perpendicular to the axis.

3. The pipe fitting of claim 1, comprising:

the groove defines a plane perpendicular to the axis and tangent to an end of the groove closer to the outlet than the inlet, a first length of the collar extends out of the groove, the inner wall has a second length from the plane to an end of the inner wall, the outer wall has a third length from the plane to an end of the outer wall, the first length is greater than a difference between the second length and the third length.

4. The pipe fitting of claim 1, comprising:

a first length by which the collar extends out of the groove is within twenty percent of a diameter of the pipe.

5. The pipe fitting of claim 1, comprising:

the pipe fitting is a mechanical tee, an elbow, a cross, or a coupling.

6. The pipe fitting of claim 1, comprising:

the groove, the head of the gasket, and the collar of the gasket each circumscribe the axis.

7. The pipe fitting of claim 1, comprising:

the gasket is made of a more resilient material than the pipe fitting.

8. The pipe fitting of claim 1, comprising:

the outlet is sized to connect with a second pipe or a sprinkler.

9. The pipe fitting of claim 1, comprising:

an outer surface of the collar is contiguous with the head.

10. The pipe fitting of claim 1, comprising:

the inner wall extends further than the outer wall in a direction parallel with the axis.

11. A piping system, comprising:

a pipe comprising an interior surface and an exterior surface and defining a hole from the interior surface to the exterior surface;

a fitting to mount to the pipe to couple the pipe with a branch pipe, the fitting comprising an inlet around an axis and at least one wall forming a groove outward from the inlet relative to the axis, the inlet structured to not extend into the hole past the exterior surface;

a gasket comprising a head and a collar extending from the head, the gasket sized to be received in the groove such that the head is inside the groove and the collar is outside the groove and in contact with the hole; and the head is outside the hole while the collar extends through the hole.

12. The piping system of claim 11, comprising:

the axis is a first axis; and the pipe is disposed around a second axis perpendicular to the first axis.

13. The piping system of claim 11, comprising:

the fitting comprises a clamp and at least one fastener to engage the clamp.

14. The piping system of claim 11, comprising:

an outer edge of the collar is inward from an outer edge of the head relative to the axis.

15. The piping system of claim 11, comprising:

the fitting comprises a passageway from a first end to a second end, the groove is at the second end.

16. The piping system of claim 11, comprising:

the fitting is a mechanical tee, an elbow, a cross, or a coupling.

17. The piping system of claim 11, comprising:

the fitting comprises a rigid body having the interior surface and the exterior surface.

18. The piping system of claim 11, comprising:

a first length by which the collar extends out of the groove is no greater than twenty percent of a diameter of the pipe.

* * * * *